US009408413B2

(12) United States Patent
Oropeza et al.

(10) Patent No.: US 9,408,413 B2
(45) Date of Patent: *Aug. 9, 2016

(54) DRYER BARREL BASKET

(71) Applicant: F.I.R.M., Inc., Yuma, AZ (US)

(72) Inventors: Jesus R. Oropeza, Yuma, AZ (US); Carlos Carrasco, Yuma, AZ (US); Guillermo Villa Pasos, San Luis, AZ (US)

(73) Assignee: F.I.R.M., INC., Yuma, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/522,433

(22) Filed: Oct. 23, 2014

(65) Prior Publication Data

US 2015/0040423 A1 Feb. 12, 2015

Related U.S. Application Data

(62) Division of application No. 13/651,129, filed on Oct. 12, 2012, now Pat. No. 8,893,613.

(60) Provisional application No. 61/645,606, filed on May 10, 2012.

(51) Int. Cl.
| A23J 1/00 | (2006.01) |
| A23B 5/00 | (2006.01) |
| A23N 1/00 | (2006.01) |
| A47J 43/14 | (2006.01) |
| A23N 12/08 | (2006.01) |
| F26B 5/08 | (2006.01) |
| F26B 11/02 | (2006.01) |

(Continued)

(52) U.S. Cl.
CPC ............... *A23N 12/086* (2013.01); *A47J 43/24* (2013.01); *F26B 5/08* (2013.01); *F26B 11/026* (2013.01); *F26B 25/12* (2013.01)

(58) Field of Classification Search
CPC .......... F26B 5/08; F26B 11/026; F26B 25/12; A47J 43/24; A23N 12/086
USPC .......... 99/501; 34/58, 63, 108, 318–319, 322, 34/425, 499, 573; 68/19.2, 23 R, 23.3
See application file for complete search history.

(56) References Cited

U.S. PATENT DOCUMENTS

| 2,556,153 A | 6/1951 | Collins |
| 5,102,803 A | 4/1992 | Weaver |
| 5,121,876 A | 6/1992 | Johnson |

(Continued)

OTHER PUBLICATIONS

USPTO; Office Action dated Feb. 14, 2013 in U.S. Appl. No. 13/651,129.

(Continued)

*Primary Examiner* — Dana Ross
*Assistant Examiner* — Lindsey C Teaters
(74) *Attorney, Agent, or Firm* — Snell & Wilmer L.L.P.

(57) ABSTRACT

A dryer barrel basket may include a body with a mesh surface. The dryer barrel basket may also include a door positioned proximate a bottom portion of the dryer barrel basket. The dryer barrel basket may further include a hinge which may be sized and configured to allow the door to rotate between an open and closed position. In addition, the dryer barrel basket may include a locking mechanism that is configured to secure the door to the mesh body in a closed position and allow the door to be disposed in an open position using an opening mechanism.

19 Claims, 5 Drawing Sheets

(51) Int. Cl.
*A47J 43/24* (2006.01)
*F26B 25/12* (2006.01)

(56) References Cited

U.S. PATENT DOCUMENTS

| 5,282,319 A | 2/1994 | Casquilho et al. |
| 2003/0104149 A1 | 6/2003 | Taniguchi et al. |
| 2005/0229355 A1 | 10/2005 | Crouch et al. |

OTHER PUBLICATIONS

USPTO; Final Office Action dated Jun. 21, 2013 in U.S. Appl. No. 13/651,129.

USPTO; Advisory Action dated Sep. 4, 2013 in U.S. Appl. No. 13/651,129.

USPTO; Notice of Allowance dated Jul. 28, 2014 in U.S. Appl. No. 13/651,129.

DRYER BARREL BASKET

CROSS-REFERENCE TO RELATED APPLICATIONS

The present application is a divisional of, claims priority to and the benefit of, U.S. Ser. No. 13/651,129 filed Oct. 12, 2012 and entitled "DRYER BARREL BASKET." The '129 application claims priority to U.S. Provisional Application Ser. No. 61/645,606 entitled "DRYER BARREL BASKET" filed May 10, 2012. Both of which are incorporated herein by reference in their entirety for any purpose.

FIELD OF INVENTION

The present disclosure generally relates to a structure that may be used to dry items such as produce and, in particular, to a dryer barrel basket that may be used to dry large quantities of leafy vegetables.

BACKGROUND OF THE INVENTION

An important step in preparing large quantities of fruits and/or vegetables for sale is to thoroughly wash the product in order to remove dirt and/or insecticides. After washing, the fruits and/or vegetables are dried as remaining water may provide an environment for bacteria to grow and spoil the product. Leafy vegetables such as lettuce, cabbage and spinach are especially susceptible to spoilage if not adequately dried. These products are much more difficult to dry than products such as apples, peaches or pears because of the larger irregular surface area per unit volume of the leafy vegetable where water can be trapped.

In order to dry leafy vegetables, conventional spin dryer systems may be used. Known dryer systems may include a dryer barrel basket into which the produce is loaded at a loading station. After spin drying, the dryer barrel basket is lifted out of the dryer and transported by a conveyor hoist to an unloading area. The bottom of the dryer barrel basket is then opened to empty the contents out of the dryer barrel basket. This is typically accomplished by opening a two section trap door on the bottom of the dryer barrel basket.

These two section trap door double bottom doors generally form two halves of the circular shaped bottom of the dryer barrel split down the middle. Thus, these doors generally swing closed towards the middle of the dryer barrel. During closing, this setup generally requires an operator to hold a first door closed with one hand while swinging the second door upwards with the other hand with sufficient force to lock the doors in place. This arrangement is not an optimal, nor does it result in an efficient process. It would be advantageous to have a system and/or apparatus with a design configured for more convenient use.

Also, emptying these conventional baskets presents challenges. Traditionally, doors of some known dryer barrel baskets have a handle to open the doors on the bottom of the basket located on the bottom of the dryer barrel basket, generally collocated on and/or near the swinging doors. Thus, the operator is often required to reach under the dryer barrel basket to access the handle and release a lock securing the door to the dryer barrel basket. It would be advantageous to have a system and/or apparatus with a more efficient design.

The subject matter claimed herein is not limited to embodiments that solve any disadvantages or that operate only in environments such as those described above. Rather, this background is only provided to illustrate one exemplary technology area where some embodiments described herein may be practiced.

SUMMARY OF THE INVENTION

The present invention relates to an improved dryer barrel and apparatus designed to address, among other things, the aforementioned deficiencies in prior art drying systems. In general, exemplary embodiments may relate to a dryer barrel basket. Specifically, the dyer barrel basket may include a bottom door with opening mechanism which does not put the operator in harm's way. Stated another way, the opening mechanism is not located on the underside of the dryer barrel basket. Rather, this opening mechanism, such as a handle for opening the bottom door, may be located in any suitable location, but is preferably located on a side of the spin barrel basket, such as the tubular side of the spin barrel basket.

According to various aspects of the present disclosure, in an embodiment, the dryer barrel basket may include a substantially tubular shaped body, such as a tubular mesh body. In addition, the dryer barrel basket may include a hinge which may be configured to allow the bottom door pivot open on an axis. The dryer barrel basket may further include a locking mechanism that may be configured to secure the door in a closed position. The locking mechanism may be mechanically coupled to the opening mechanism to allow the door to be opened.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description and to the claims when considered in connection with the drawing figures, wherein like numerals denote like elements and wherein:

DETAILED DESCRIPTION

Figure 1:
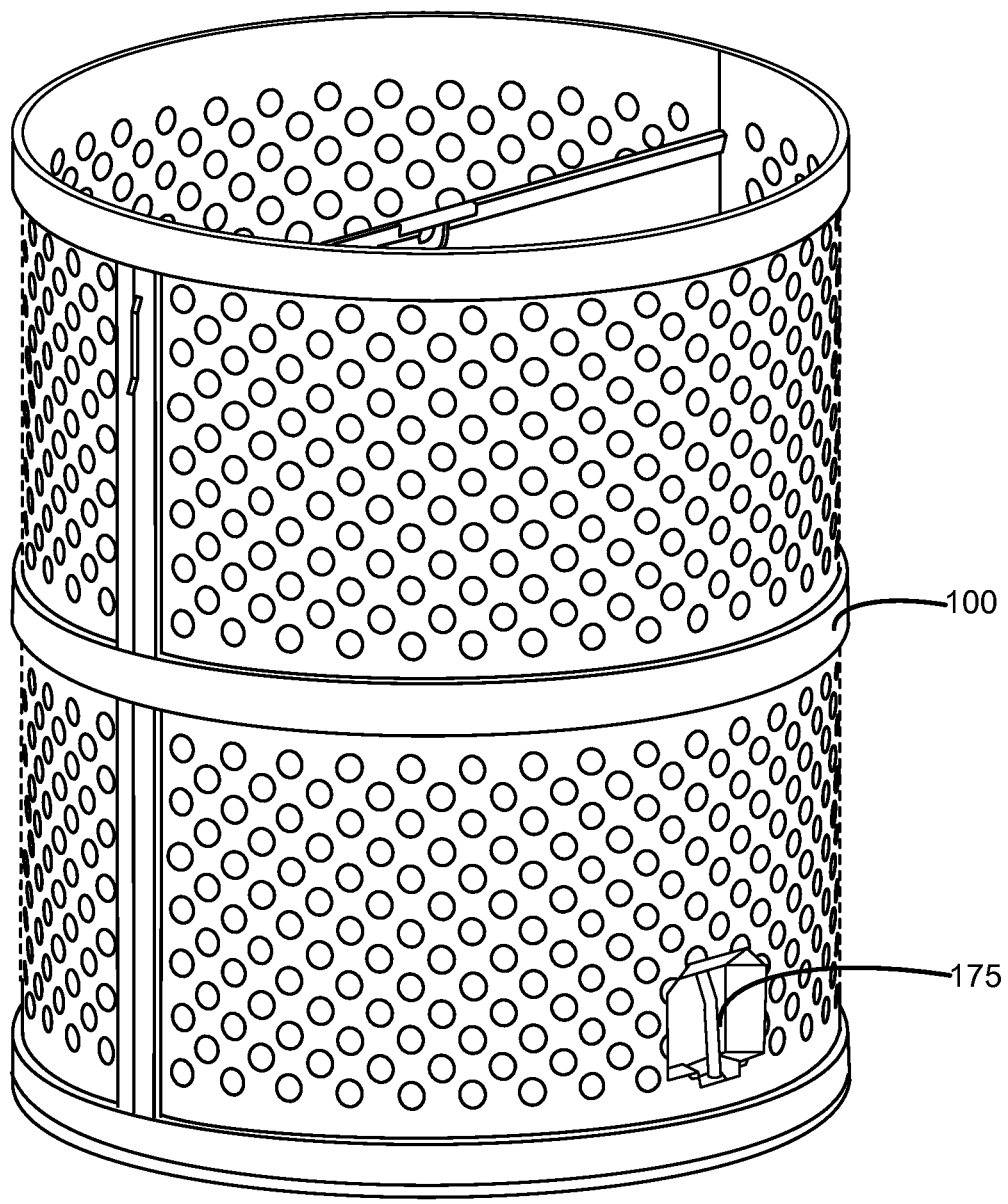
FIG. 1 is a perspective view of an exemplary embodiment of a dryer barrel basket.

According to various aspects of the present disclosure, an embodiment of a dryer barrel basket 100 comprising a dryer barrel basket body and a bottom retaining structure are disclosed. For instance, the bottom retaining structure may be a bottom door 150, flap, hatch, window and/or the like. Dryer barrel basket 100 presents numerous advantages over the existing systems. For instance, an opening mechanism 175 of bottom door 150 is located in a protected location away from the heavy moving elements of dryer barrel basket 100. Also, closing bottom door 150 may be accomplished with one fluid closing motion. This closing motion does not involve retaining additional heavy structures, such as a second door while performing the closing motion.

Dryer barrel basket 100 may be used with existing spin dryer systems and/or existing spin dryer systems may be easily retrofit to accommodate dryer barrel basket 100. As mentioned above, the bottom retaining structure may be any structure suitable for temporality retaining the contents of dryer barrel basket body within the body's generally open interior. This retaining structure is configured to move and allow the contents within the dryer barrel basket body to be emptied.

Exemplary embodiments may include dryer barrel basket 100 with bottom door 150 positioned proximate a bottom portion of dryer barrel basket 100. In various embodiments though it may be made up of multiple sections and/or multiple doors, and unlike historical trap door configurations, bottom door 150 comprises a single moving element. Stated another way, bottom door 150 may be a single door. Thus, bottom door 150 may be closed by directing force in one direction and may, in general, be closed using only one hand. Also, according to various embodiments, bottom door 150 is configured to be secured without additional manipulation by an operator. Stated another way, bottom door 150 may be self-latching. Both the self-latching functionality and the only one moving element (ability to close using one hand) aids in the effectiveness and efficiency of the operator in closing bottom door 150. According to various embodiments, the outside surface of bottom door 150 may be marked with an indicator detailing proper hand or hands placement for closing of bottom door 150.

According to various embodiments, though its opening motion may be any known opening motion, such as a slide, hinge, track system, and/or the like, bottom door 150 is configured to open by pivoting on a hinge. This hinge 155 may be coupled to dryer barrel basket 100 in any suitable location. Thus, hinge 155 may be located within an interior surface of dryer barrel basket 100, along the bottom edge of the tubular shaped dryer barrel basket body or on an exterior surface of dryer barrel basket 100. Additionally, hinge 155 may be located in any position of bottom door 150. It may be beneficial to locate the pivot point of bottom door 150 closer to the center of bottom door 150, thus, reducing the amount of force needed to close bottom door 150. For instance, locating hinge 155 on the edge of bottom door 150 may be unwieldy for a single operator to close. Also, it may be beneficial to locate hinge 155 in a position such that material to be released from within the dryer barrel basket body may assist in the smooth opening of bottom door 150, such as by creating a counter weight. Thus, it may be beneficial to locate hinge 155 in a location to assist with closing and opening of bottom door 150.

The release mechanism of bottom door 150, such as opening mechanism 175, is designed such that its location and operation protects an operator from unintended contact with the moving parts of dryer barrel basket 100. For example, an operator need not reach under dryer barrel basket 100 to open bottom door 150 and/or access opening mechanism 175. Moreover, opening mechanism 175 is generally located away from the moving elements of bottom door 150. Thus, according to various embodiments, movement of bottom door 150 moving from a closed position to an open position may swing away from a fixed location of opening mechanism 175.

Opening mechanism 175 may be located in any suitable location on dryer barrel basket 100; however, to assist use, preferably, opening mechanism 175 is located on a side surface of dryer barrel basket body, such as along the tubular body of dryer barrel basket 100. In this way, opening mechanism 175 is not located in the same plane as the bottom door 150, nor is it in close proximity to the movement of bottom door 150. Additionally, though opening mechanism 175 may be located anywhere along dryer barrel basket body, in general, opening mechanism 175 is preferably located near the bottom of dryer barrel basket 100. In this way, an operator need not strain to reach opening mechanism 175 while dryer barrel basket 100 is in an elevated position, which is common during operation. Though it may be located on the surface, as dryer barrel basket 100 rotates at high speeds during operation, opening mechanism 175 may be recessed on a side surface of dryer barrel basket 100 to both protect the mechanism itself and the internal surfaces of the dryer.

Opening mechanism 175, in general, is coupled to aspects of locking mechanism 185. Thus, according to various embodiments, opening mechanism 175 is mechanically coupled to locking mechanism 185. Opening mechanism 175 may be any suitable mechanism that is used to disengage locking mechanism 185 which holds the bottom retaining structure, (e.g. bottom door 150) in a closed and/or locked position. For instance, opening mechanism 175 may be a handle, pull, push, button, switch, lever, knob, and/or the like. An operator operating opening mechanism 175 may disengage locking mechanism 185 using any suitable movement action such as a push, pull, twist, up or down movement. Opening mechanism 175 and/or locking mechanism 185, may comprise mechanical, electrical, fluid or pneumatic operation, however, due to extreme conditions generally faced by these barrel baskets, preferably, opening mechanism 175 and/or locking mechanism 185 comprise mechanical operation.

As disclosed herein, while bottom door 150 is in a closed position, it is retained by locking mechanism 185. Locking mechanism 185 may be any fastening device, generally for holding bottom door 150 in a closed position that may be released through interaction with a physical object, such as opening mechanism 175. Though multiple locking mechanism 185 elements to secure bottom door 150 are contemplated, according to various embodiments, one locking mechanism 185 may be used. Though manual manipulation of locking mechanism 185 to secure bottom door 150 closed may be used, according to various embodiments, no manual manipulation of locking mechanism 185 to secure bottom door 150 closed is needed. For instance, locking mechanism 185 may be self-locking. Locking mechanism 185 may be self-locked through any suitable means, such as by being spring operated.

Figure 2:
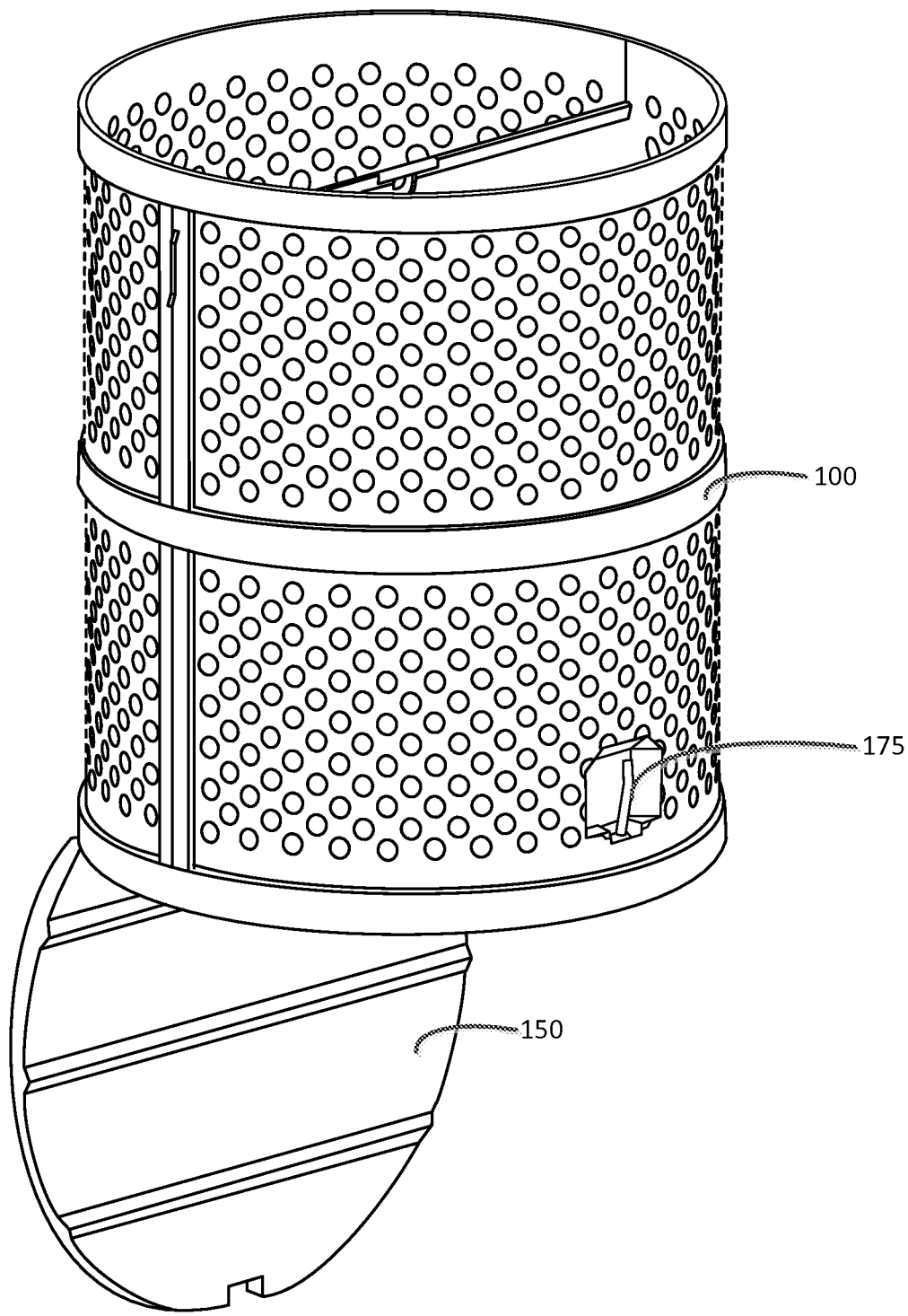
FIG. 2 is another perspective view of the dryer barrel basket of FIG. 1, illustrating a door to the dryer barrel basket in an open position.
Figure 3:
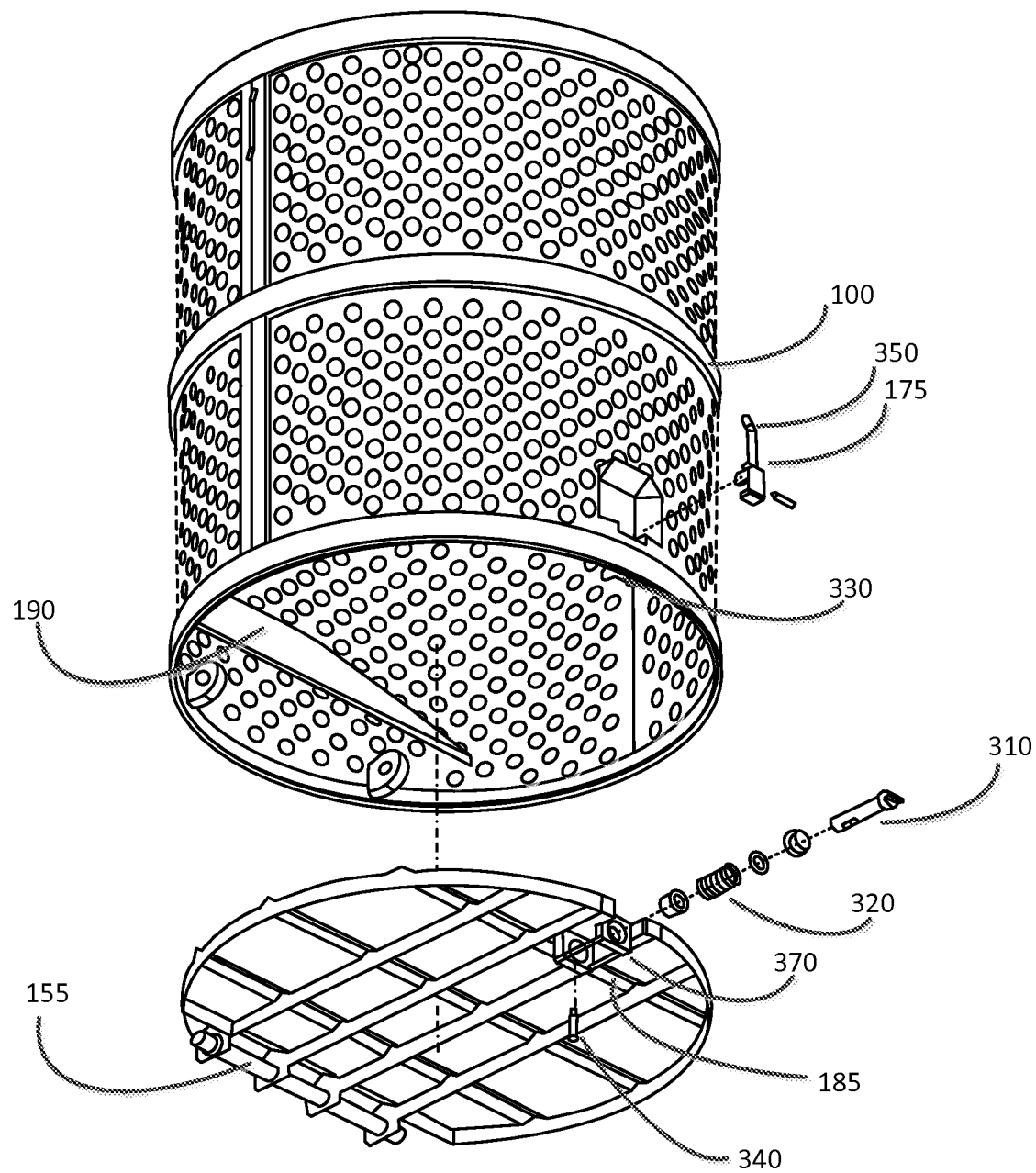
FIG. 3 is an exploded perspective view of the dryer barrel basket of FIGS. 1 and 2, illustrating an exemplary locking mechanism.

With reference to FIGS. 1-3, an exemplary embodiment of dryer barrel basket 100 comprising a body with a mesh surface is depicted. The mesh surface may include a plurality of openings that are sized and configured to allow fluid, such as water, to pass through. Dryer barrel basket 100 may also include bottom door 150 positioned proximate a bottom or lower portion of dryer barrel basket 100. As shown in FIG. 1, bottom door 150 may be disposed in a closed position. Dryer barrel basket 100 may also include locking mechanism 185 that may help secure bottom door 150 in a closed and locked position. Locking mechanism 185 may be unlocked to allow bottom door 150 to be opened. Locking mechanism 185 may be unlocked using opening mechanism 175.

As shown in FIG. 2, bottom door 150 may be disposed in an open position to empty the contents of dryer barrel basket 100. Dryer barrel basket 100 may also include a lift bar positioned near a top of the dryer barrel basket 100. The lift bar may be configured to allow dryer barrel basket 100 to be raised by a hoist, such as a conveyor hoist or other suitable mechanism, which may facilitate movement of dryer barrel basket 100.

As shown in FIG. 3, dryer barrel basket 100 may include hinge 155 that is sized and configured to allow bottom door 150 to rotate relative to the dryer barrel basket body. For example, hinge 155 may attach bottom door 150 to the dryer barrel basket body. Hinge 155 may allow bottom door 150 to rotate relative to a first side and/or the tubular side surface of the dryer barrel basket body. According to various embodiments, this rotational movement is in a direction substantially away from locking mechanism 185 and/or opening mechanism 175. Locking mechanism 185 may be sized and configured to help secure bottom door 150 to the dryer barrel basket body in a closed position. Locking mechanism 185 may also be sized and configured to allow bottom door 150 to be opened.

According to various embodiments, dryer barrel basket 100 may also include one or more structure, such as a wall 190, located in the interior of dryer barrel basket 100. Wall 190 may be any shape or size. Wall 190 may be curved or straight. Though there may be gaps, the edges of wall 190 are preferably flush with the interior substantially curved surfaces of dryer barrel basket 100 to reduce the likelihood of material being trapped within dryer barrel basket 100 and/or inhibiting the workings of bottom door 150. Wall 190 may be disposed at any suitable angle, such as an angle relative to the tubular shaped dryer barrel basket body. This angle of wall 190, and the void it behind wall 190 between the top of bottom door 150 and a bottom interior portion of dryer barrel basket 100, may accommodate a portion of bottom door 150 as bottom door 150 moves from a closed first position to an open second position while pivoting on hinge 155. Wall 190 may be configured to allow the contents of dryer barrel basket 100, such as produce and/or leafy green vegetables, to be dispersed along bottom door 150 in a manner to assist with opening bottom door 150.

For instance, in operation, spin dryer systems (without wall 190) generally spin the contents of dryer barrel basket 100 to be substantially evenly distributed along the base and/or bottom door 150. This evenly distribution of material may inhibit operation of hinge 155 which may be oriented such that bottom door 150 is configured to pivot, such as pivoting on a fulcrum. Thus, wall 190 is configured to prevent substantially even distributed of material along the base of dryer barrel basket 100 and/or bottom door 150. Additionally, wall 190 is configured to direct a material within dryer barrel basket 100 away from a portion of bottom door 150, such as the portion of bottom door 150 under wall 190. Stated another way, wall 190 may direct a portion of the contents of dryer barrel basket 100 to a desired location, such as generally towards the location of locking mechanism 185. In this way, the weight of the material in the dryer barrel basket 100, such as the produce and/or leafy green vegetables may be directed to a location on top of door 150, such that in response to the opening of locking mechanism 185, smooth operation of bottom door 150 is achieved. Wall 190 also directs material away from the generally smaller portion of bottom door 150 which opens up into the interior of dryer barrel basket body as the larger portion opens down and away from the edge of the tubular shaped body of the dryer barrel basket body. For example, wall 190 may be configured to direct material to cover about ¾ of the top surface of bottom door 150. Wall 190 may be configured to direct material away from about ¼ of the top surface of bottom door 150.

Though locking mechanism 185 may be any locking mechanism, as shown in FIG. 3, it may include multiple components. These components may include a latch bar 310, a spring 320, and a latch shelf 330. Latch bar 310 may be positioned generally parallel to a lower surface of bottom door 150. Latch bar 310 may be movable between one or more positions. Additionally, latch bar 310 may be concentrically disposed within spring 320. If desired, a latch shelf 330 may be sized and configured to receive a portion of the latch bar 310 when bottom door 150 is in the closed position.

Similarly to locking mechanism 185, opening mechanism 175 may be any opening mechanism. As shown in FIG. 3, it may include multiple components including a handle 350. Handle 350 may be positioned substantially parallel to the tubular shaped mesh body and substantially perpendicular to bottom door 150. Handle 350 may be configured to allow an operator to depress 320 and move latch bar 310 from being retained by latch shelf 330.

Bottom door 150 may include surface features to interact with locking mechanism 185. Stated another way, elements of locking mechanism 185 may be integral to bottom door 150, integral to dryer barrel body and/or a combination thereof.

For instance, bottom door 150 may include a block 370 with at least one opening for receiving various components of locking mechanism 185, such as one or more rings, spring 320, and latch bar 310. The rings may be sized and configured to restrain spring 320 from protruding beyond block 370, and the rings may allow movement of latch bar 310 between open and closed positions.

Figure 4B:
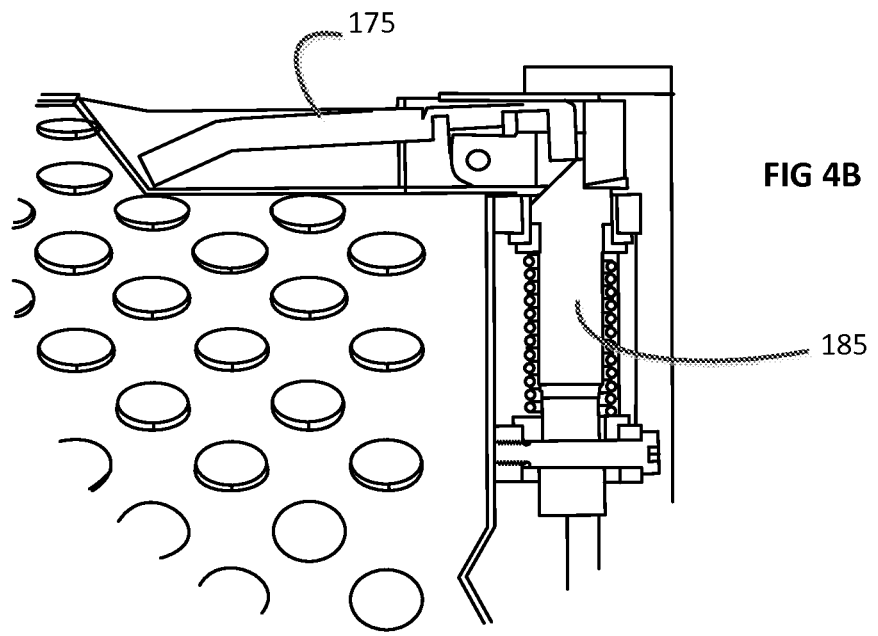
FIGS. 4A-4B depict an exemplary side view of the dryer barrel basket and an enlarged view of a portion of the dryer barrel basket, illustrating the locking mechanism in a closed position and the door in a closed position.
Figure 4A:
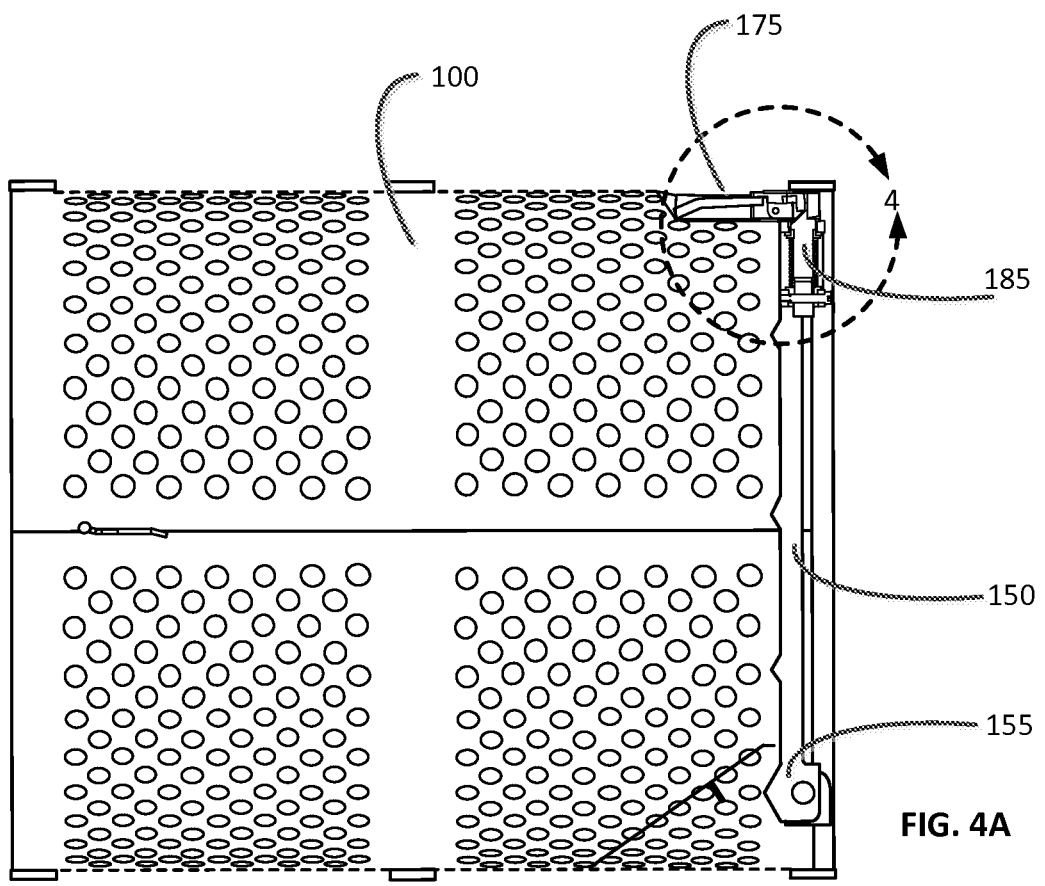

As shown in FIG. 4A, locking mechanism 185 of dryer barrel basket 100 may be disposed in a closed position with latch bar 310 in the closed position where bottom door 150 in a first position. In the closed position, latch shelf 330 may be configured to receive latch bar 310 and bottom door 150 in the first position. Handle 350, which may be disposed substantially parallel to the tubular dryer barrel body and substantially perpendicular to bottom door 150, may be used to help control the movement of the bottom door 150, such as movement from the first position to a second open position. Stated another way, bottom door 150 may be opened by pulling on handle B350.

Figure 5B:
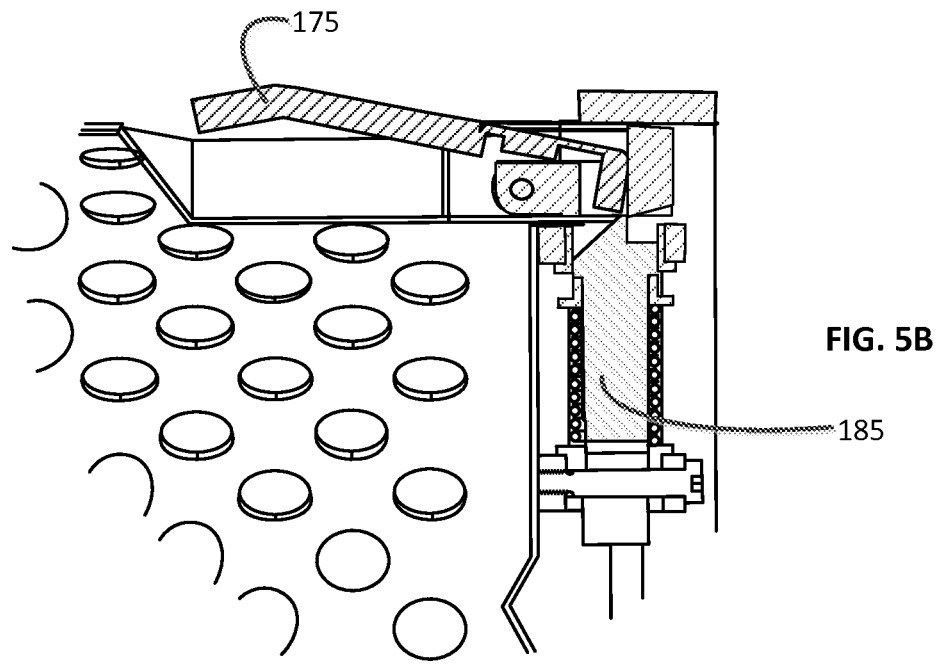
FIGS. 5A-5B depict an exemplary side view of the dryer barrel basket and an enlarged view of a portion of the dryer barrel basket, illustrating the locking mechanism in an open position and the door in the closed position.
Figure 5A:
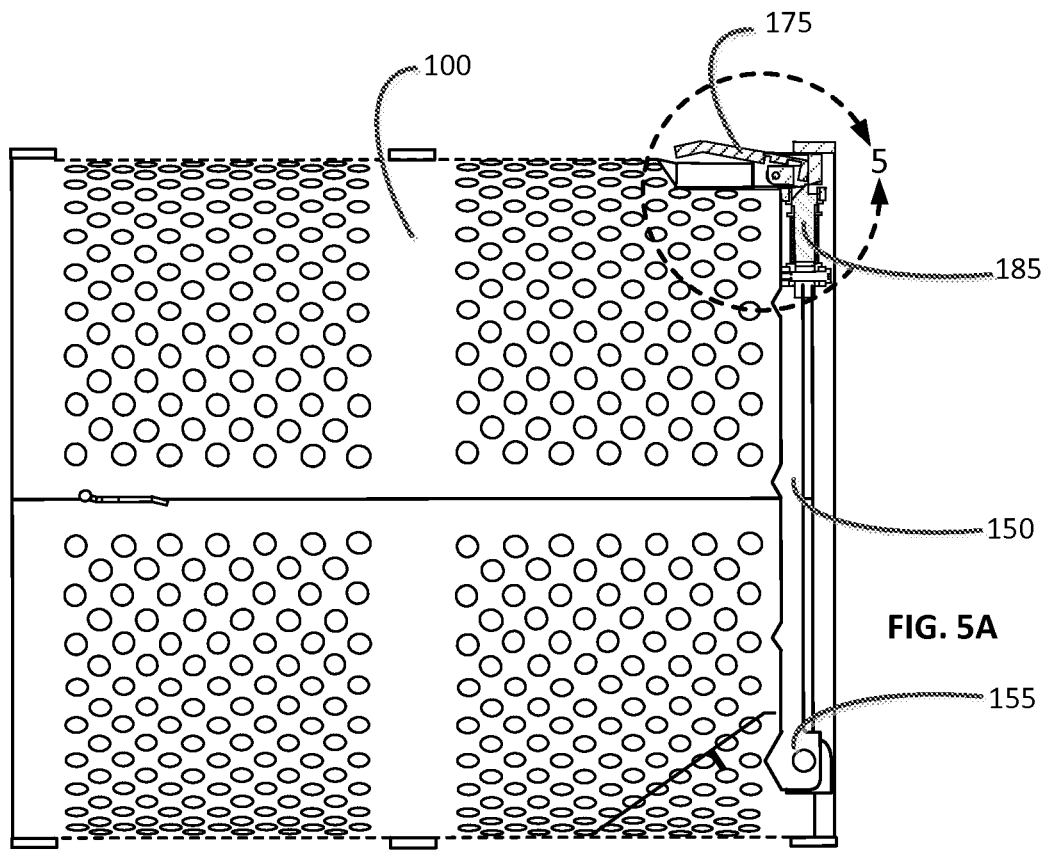

FIG. 5B shows the locking mechanism 185 of dryer barrel basket 100 with latch bar 310 in the open position and bottom door 150 in the closed position. As discussed herein, handle 350 may be configured to depress the spring and move latch bar 310 away from latch shelf 330 in order to open bottom door 150 and the empty the contents of dryer barrel basket 100.

As discussed herein, traditional dryer baskets have a height, such as a set height, where they are hoisted above a receiving basket, such as hopper. Multiple dryer baskets may be emptied into each hopper. For instance, 3-4 dryer baskets may be emptied into each hopper prior to moving the filled hopper for weighing on a scale without damaging the contents of the hopper. As there is, in general, clearance available between the bottom of the dryer basket and the top of the contents of the hopper, workers occasionally overfill the hopper with 5-6 dryer baskets by creating a mound in the hopper. This overfilling of the hopper may result in mechanical damage to the contents of the hopper due to weight on the material at the bottom of the hopper. Dryer barrel basket 100 having a single bottom door 150, which extends further than conventional trap door/dual door systems, is configured to govern and/or limit the amount of times dryer barrel basket 100 (hoisted at the same height as traditional dryer baskets) may be emptied into the hopper. This prevents occurrences of mechanical damage to the material delivered to the hopper.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. Those skilled in the art having read this disclosure will recognize that changes and modifications may be made to the exemplary embodiments without departing from the scope of the present invention. These and other changes or modifications are intended to be included within the scope of the present invention, as expressed in the following claims.

The invention claimed is:

1. A dryer barrel basket comprising:
   a tubular shaped body configured for rotation about an axis, wherein the tubular shaped body comprises a surface comprising a plurality of openings that are sized and configured to allow fluid to pass through the surface during spin drying;
   a bottom door of the tubular shaped body;
   an opening mechanism for opening the bottom door; and
   an angled wall located internal to the tubular shaped body, wherein the angled wall is configured to form a void configured to accommodate a portion of the bottom door as the bottom door moves from a closed first position to an open second position while pivoting on a hinge axis.

2. The dryer barrel basket of claim 1, further comprising a locking mechanism coupled to the opening mechanism.

3. The dryer barrel basket of claim 2, wherein the locking mechanism is self-locking.

4. The dryer barrel basket of claim 1, wherein the opening mechanism is recessed from a side surface of the tubular shaped body.

5. The dryer barrel basket of claim 1, wherein the angled wall is configured to prevent a substantially even distribution of a material over a top surface of the bottom door.

6. The dryer barrel basket of claim 1, further comprising a hinge coupling the bottom door and the tubular shaped body, wherein the bottom door pivots on the hinge axis.

7. The dryer barrel basket of claim 6, wherein a small segment of the bottom door is located on one side of the hinge axis and a large segment of the bottom door as compared with the small segment is located on another side of the hinge axis.

8. The dryer barrel basket of claim 1, wherein the opening mechanism is positioned on a side surface of the tubular shaped body.

9. The dryer barrel basket of claim 1, wherein the movement of the bottom door moving from a closed position to an open position swings away from a fixed location of the opening mechanism.

10. The dryer barrel basket of claim 1, wherein the angled wall is configured to direct a material within the dryer barrel basket away from the hinge axis of the bottom door.

11. A method comprising:
    operating an opening mechanism of a dryer barrel basket, the dryer barrel basket configured for rotation about an axis,
    wherein a side surface of the dryer barrel basket comprises a surface comprising a plurality of openings that are sized and configured to allow fluid to pass through the surface during spin drying,
    wherein the operating of the opening mechanism causes a locking mechanism to disengage, wherein a hinged bottom door opens in response to the disengaging,
    wherein the dryer barrel basket comprises an internal angled wall,
    wherein the internal angled wall is configured to direct a material within the dryer barrel basket away from a hinge axis of the hinged bottom door,
    wherein the internal angled wall is configured to form a void, and
    wherein the void is configured to accommodate a portion of the hinged bottom door as the hinged bottom door moves from a closed first position to an open second position while pivoting on the hinge axis.

12. The method of claim 11, wherein the opening mechanism is located on a tubular shaped side surface of the dryer barrel basket.

13. A dryer barrel basket comprising:
    a tubular shaped body comprising a plurality of openings that are sized and configured to allow fluid to pass through a surface of the tubular shaped body during spin drying, wherein the tubular shaped body is configured for rotation about an axis;
    a bottom door;
    a hinge connecting the bottom door and the tubular shaped body; and
    an angled wall located internal to the tubular shaped body in a bottom portion thereof, and at least partially above a portion of the bottom door is configured to direct a material within the dryer barrel basket away from a hinge axis of the bottom door,
    wherein the angled wall is configured to form a void that is configured to accommodate a portion of the bottom door.

14. The dryer barrel basket of claim 13, further comprising an opening mechanism positioned on a side surface of the tubular shaped body for opening the bottom door; and
    a locking mechanism for securing the bottom door in a closed position, wherein the opening mechanism is coupled to the locking mechanism.

15. The dryer barrel basket of claim 14, wherein the opening mechanism is recessed from the side surface of the tubular shaped body.

16. The dryer barrel basket of claim 14, wherein the movement of the bottom door moving from the closed position to an open position swings away from a location of the opening mechanism.

17. The dryer barrel basket of claim 13, wherein a small segment of the bottom door is located on one side of the hinge axis and a large segment of the bottom door as compared with the small segment is located on another side of the hinge axis.

18. The dryer barrel basket of claim 13, wherein the dryer barrel basket is configured to be used within a spin dryer.

19. The dryer barrel basket of claim 13, wherein the angled wall is configured to prevent a substantially even distribution of the material over a top surface of the bottom door.

* * * * *